United States Patent [19]
Webb

[11] Patent Number: 6,005,996
[45] Date of Patent: Dec. 21, 1999

[54] BRANCHING UNIT FOR AN OPTICAL FIBER TRANSMISSION SYSTEM

[75] Inventor: Stephen Michael Webb, Kent, United Kingdom

[73] Assignee: Alcatel, Paris, France

[21] Appl. No.: 08/945,906

[22] PCT Filed: Feb. 28, 1997

[86] PCT No.: PCT/GB97/00567

§ 371 Date: Oct. 31, 1997

§ 102(e) Date: Oct. 31, 1997

[87] PCT Pub. No.: WO97/32409

PCT Pub. Date: Sep. 4, 1997

[30] Foreign Application Priority Data

Mar. 1, 1996 [GB] United Kingdom .................... 9604427

[51] Int. Cl.[6] ....................................................... G02B 6/26
[52] U.S. Cl. ............................................................... 385/24
[58] Field of Search ..................................... 327/365, 423, 327/438; 359/110; 385/16, 23, 24

[56] References Cited

U.S. PATENT DOCUMENTS

| | | | |
|---|---|---|---|
| 4,879,762 | 11/1989 | Hanyuda et al. | 455/601 |
| 5,214,312 | 5/1993 | Inoue | 307/43 |
| 5,717,796 | 2/1998 | Clendening | 385/24 |

FOREIGN PATENT DOCUMENTS

| | | |
|---|---|---|
| 0495509 | 7/1992 | European Pat. Off. . |
| 2275834 | 9/1994 | United Kingdom . |
| 2287625 | 9/1995 | United Kingdom . |

*Primary Examiner*—Hung N. Ngo
*Attorney, Agent, or Firm*—Ware, Fressola, Van Der Sluys & Adolphson LLP

[57] ABSTRACT

A branching unit for an optical fiber transmission system has a pair of inputs/outputs for receiving an end of a different section of trunk cable of the type having an electrical conductor and one or more pairs of optical fibres. A switching circuit (8) is effective to selectively route power between the electrical conductors (54, 56) of each trunk section or via an earth return (72) in response to a supervisory signal provided on the trunk.

19 Claims, 1 Drawing Sheet

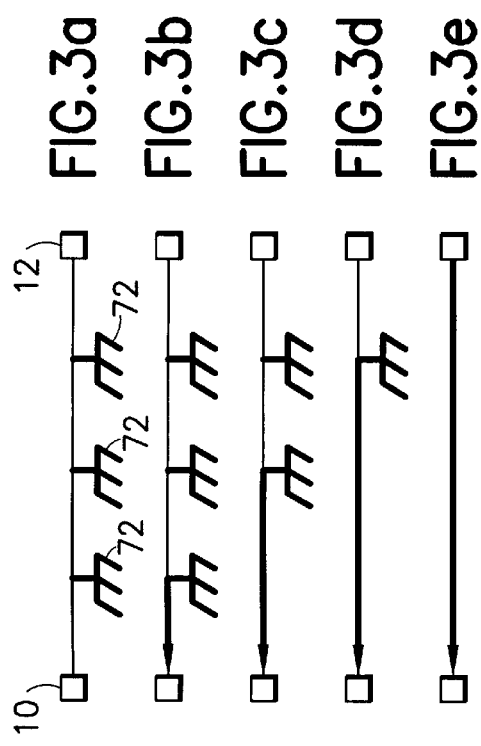
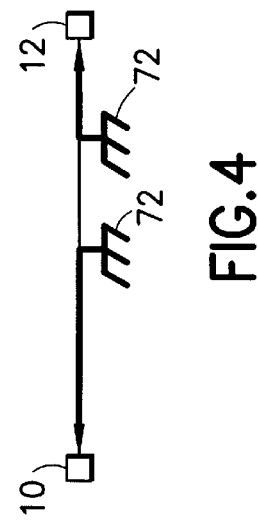
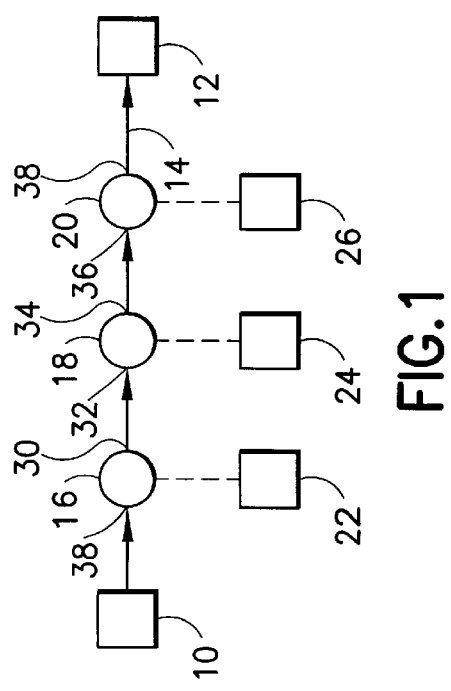
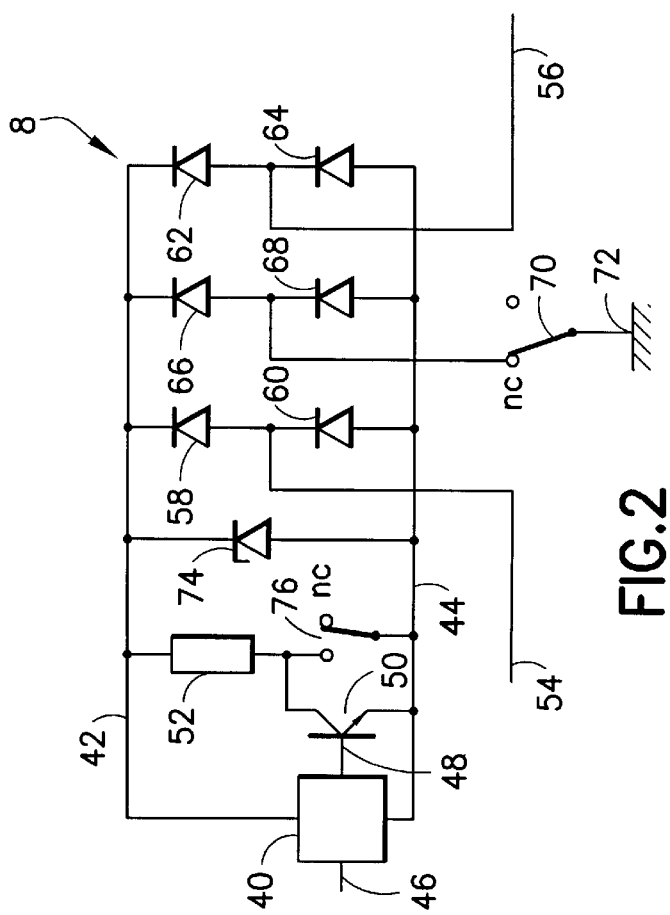

BRANCHING UNIT FOR AN OPTICAL FIBER TRANSMISSION SYSTEM

This invention relates to a branching unit for an optical fibre transmission system which permits powering by electrical power provided from either direction on a trunk but which permits selective isolation of cable sections which are coupled via the branching units.

In the operation of optical fibre communication systems over long distances where there are a number of branches problems can arise due to a trunk cable fault or breakage which results in failure of transmission between terminals at opposite sides of the fault or break. Under such fault conditions it is still possible to communicate between terminals on the same side of the break and electrical power can be supplied to branching units from a trunk end on the appropriate side of the break. A difficulty which arises is in repairing the fault or break which normally requires the system power to be switched off to isolate the brake which requires the whole system to be out of action. The present invention is concerned with the provision of means for isolating a section of cable from the power supply to permit repair whilst still permitting the remainder of the system to be operational.

According to the invention there is provided a branching unit for an optical fibre transmission system having a pair of inputs/outputs for receiving an end of a different section of trunk cable of the type having an electrical conductor and one or more pairs of optical fibres, wherein a switching circuit is effective to selectively route power between the electrical conductors of each trunk section or via an earth return in response to a supervisory signal provided on the trunk.

The switching circuit may have a latching function effective once switched to maintain the routing via the earth return until power is removed. The switching circuit may comprise a relay. The relay may be a latching relay which is effective once switched to maintain the routing via the earth return until power is removed. The switching circuit may also comprise a transistor switch coupled to the relay coil which transistor switch is driven by a control circuit in response to the supervisory signal.

The branching unit may include a diode bridge circuit, comprising two parallel arms each having a pair of diodes connected in series anode to cathode the ends of which arms are cross coupled to anode to anode and cathode to cathode, wherein a connection for individual electrical conductors, of different trunk cable sections is provided at the junction between diodes of each pair of arms, and the transistor and relay coil switching arrangement is coupled between the ends of the arms. A refinement of the branching unit is wherein there is provided a further parallel arm having a pair of diodes connected in series anode to cathode is connected in the same sense between the cross coupled ends of the two parallel arms and the junction between the diodes of the further parallel arm is coupled to earth via normally closed relay contacts. A Zener diode may be connected between the cross coupled ends of the parallel arms to regulate the voltage for the transistor and relay coil circuit.

The earth return may be a sea earth.

The switching circuit may be responsive to an optical supervisory signal provided over one of the optical fibres. Alternatively the switching circuit may be responsive to an electrical supervisory signal provided over the electrical conductor.

The invention also includes an optical transmission system comprising a trunk cable provided with two or more spaced branching units as previously defined, wherein the switching circuit in each branching unit is responsive to a different supervisory signal thereby to permit selective coupling of power between adjacent branching units or to earth in response to a supervisory signal provided from at least one cable end to permit isolation of power feed to a trunk section.

In order that the invention and its various other preferred features may be understood more easily, some embodiments thereof will now be described, by way of example only, with reference to the drawings, in which:

FIG. 1 is a schematic illustration showing an optical transmission system in which branching units in accordance with the invention are employed, FIG. 2 is a schematic circuit diagram of a branching unit constructed in accordance with the invention, FIGS. 3a to 3e illustrate schematically the powering up of an optical transmission system constructed in accordance with the invention, FIG. 4 illustrates schematically the powering up under trunk fault conditions.

Referring now to FIG. 1 there is shown an optical transmission system e.g. an underwater transmission system comprising remote base stations 10, 12 coupled via a trunk cable 14 so as to permit communication therebetween of optical transmission signals. The trunk cable is provided with a number of branching units 16, 18, 20, in the illustrated embodiment three being shown, and these are coupled to spur terminals 22, 24, 26 respectively and have input/outputs 28, 30, 32, 34, 36, 38 which are connected to ends of different sections of the trunk cable. The branching units are designed to divert specific signal wavelengths to the associated spur terminal by wavelength division multiplexing and to introduce such signal wavelengths to the trunk for onward transmission on the trunk. It will be seen that the lines joining the branching units to the spur terminals are shown dotted to signify cables containing optical fibres only whilst the trunk 14 is shown in solid line to signify cables containing both optical fibres and an electrical conductor which is provided for supplying power to the branching units to operate circuitry contained therein. Systems of this type are operational under the control of the base stations 10 and 12 from which power can be provided. The spur terminals are subservient and cannot control power on the system and it can be arranged that a spur terminal can be rendered inoperable by means of supervisory signals provided to the branching unit from a base station. A problem that arises with existing branching unit systems is that when a fault or break in the trunk cable occurs it is necessary to remove power from both ends of the trunk and disable the entire system whilst a repair is being carried out.

Referring now to FIG. 2 there is shown a branching unit switching circuit 8 which enables a section of cable having a fault or break to be isolated from power supply whilst still maintaining operation of the system each side of the break. The circuit comprises a control circuit 40 coupled to a pair of power supply lines 42, 44 and having an input 46 coupled to one of the optical fibres in the trunk. The control circuit is responsive to a predetermined supervisory signal provided on the trunk from one of the base stations. Such a supervisory signal may be a 150 KHz am modulated carrier providing a different specific digital code for each branching unit. The control circuit has an output 48 coupled to the base electrode of an NPN transistor 50. The emitter electrode of the transistor is coupled to supply line 44 whilst the collector electric electrode is coupled via a relay coil 52 to the other supply line 42. The control circuit is powered from either one of the base stations by current provided along the electrical conductor on the trunk input/outputs to consecutive trunk sections being shown at 54 and 56. These are coupled to different arms of a diode bridge the bridge having two parallel arms each having a pair of diodes 58, 60, 62, 64 connected in series anode to cathode which arms are cross coupled anode to anode and cathode to cathode and provide the supply lines 42 and 44. The connections 54 and 56 are connected to the junction between diodes of a different arm. A further similar parallel arm between the supply lines 42 and 44 comprises diodes 66, 68 again connected in series anode to cathode between the supply lines 42 and 44. The junction between the diodes 66 and 68 is coupled via normally closed contacts 70 of the relay 52 to earth 72 which in the case of underwater system is a sea earth. A Zener diode 74 is connected between the supply lines 42 and 44 to regulate the voltage provided to the control circuit.

In use if we consider branching units equipped as in FIG. 2 employed in the arrangement of FIG. 1. When the first branching unit 16 receives a voltage on the trunk from base station 10 an input/output 54 a current path exists between that end through the bridge circuit to the sea earth 70 and a voltage is developed across the supply lines 42, 44 to power the control circuit. When a dedicated supervisory signal specific to the control circuit 40 of this back up unit is sent by the base station 10 it is recognised by the control circuit which applies a control voltage to transistor 50 which causes the transistor to conduct and energise the relay coil which opens the relay contacts 70 and allows the current to flow out through input/output 56 to the next section of trunk and to power up the next branching unit 18 which can then be similarly controlled by recognition of a different dedicated supervisory signal sent by the base station. This switching action can be repeated with subsequent branching units along the trunk until all are activated. It will be appreciated that similar activation is possible in reverse order by providing power and supervisory signals from the base station 12 at the other end of the trunk.

The control circuit 40 may have a monostable function whereby the control signal is maintained only whilst its dedicated supervisory signal is continually or regularly transmitted or it may be bistable such that it remains switched once the supervisory signal has been transmitted. The relay may have an optional second pair of contacts 76 which are closed when the relay is energised so that the relay coil is self energising from the lines 42, 44 once activated thereby forming a self latching relay which is only released when the trunk is depowered.

FIGS. 3a to 3e illustrate the powering up of the system from the direction of base station 10. FIG. 3a shows the unpowered system where the relay contacts 70 are closed in each base station so as to provide a current path to earth 72. Power is switched at base station 10 and current flows from the earth in the first branching unit 16 to the base station 10 as shown in dark line in FIG. 3b. The dedicated supervisory signal for branching unit 16 is then sent and the relay is actuated which disconnects the earth in branching unit 16 and permits current to pass from the earth in branching unit 18 to provide the current flow shown in dark line in FIG. 3c. Similarly if the dedicated supervisory signal for branching unit 18 is now sent the earth is disconnected in branching unit 18 and current flows from the earth in branching unit 20 as shown in dark line in FIG. 3d. Finally if the dedicated supervisory signal for branching unit 20 is now sent the earth is disconnected from branching unit 20 and current flows between base stations 10 and 12 as shown in dark line in FIG. 3e.

In the case of a fault or break in the trunk cable established between for example branching units 18 and 20. It is possible to power up the branching units 16 and 18 from base station 10 and branching unit 20 from base station 12 and in this way the trunk sections between base stations 18 and 20 is isolated from the power supplies and can be repaired whilst permitting traffic to be maintained on individual sides of the break or fault.

Although the embodiment described employs detection of a dedicated optical signal to actuate control circuit 40 it is envisaged that an alternative arrangement could employ a dedicated electrical signal provided on the power supply line from the base stations. This might be a low frequency modulation or a pulse signal. Constructions employing this alternative are considered to fall within the scope of this invention.

The construction described has a number of specific advantages:
(1) Any number of branching units may be used in a multi-spur system design.
(2) In the preferred system the relays cannot be deenergised except by de-powering the system. This is an important safety factor as such an action could harm the relay due to an excessive discharge from the cable.
(3) The branching unit is bidirectional.
(4) Spur stations cannot upset the operation of the branching unit and jeopardise/sabotage the system.

I claim:

1. A branching unit for an optical fiber transmission system having a pair of inputs/outputs for receiving an end of a different section of trunk cable of the type having an electrical conductor and one or more pairs of optical fibers,
    wherein a switching circuit selectively routes power between electrical conductors of each trunk section or via an earth return in response to a supervisory signal provided on the trunk cable.

2. A branching unit according to claim 1, wherein the switching circuit has a latching function effective once switched to maintain the routing via the earth return until power is removed.

3. A branching unit according to claim 2, wherein the switching circuit comprises a relay coil.

4. A branching unit according to claim 3,
    wherein the switching circuit comprises a transistor switch coupled to the relay coil, and
    wherein the transistor switch is driven by a control circuit in response to the supervisory signal.

5. A branching unit according to claim 2, wherein the switching circuit comprises a latching relay which is effective once switched to maintain the routing via the earth return until power is removed.

6. A branching unit according to claim 5,
    wherein the switching circuit comprises a transistor switch coupled to the relay, and
    wherein the transistor switch is driven by a control circuit in response to the supervisory signal.

7. A branching unit according to claim 6,
    wherein the branching unit includes a diode bridge circuit comprising two parallel arms, each parallel arm having a pair of diodes connected in series anode-to-cathode with ends which are cross coupled anode-to-anode and cathode-to-cathode,
    wherein a connection for individual electrical conductors of different trunk cable sections is provided at a junction between diodes of each pair of the parallel arms, and wherein the transistor switch and the relay coil are coupled between the ends of the parallel arms.

8. A branching unit according to claim 7, wherein the branching unit includes a further parallel arm having a pair of diodes connected in series anode-to-cathode, wherein the further parallel arm is connected between the ends of the two parallel arms, and wherein the junction between the pair of diodes of the further parallel arm is coupled to earth via normally closed relay contacts.

9. A branching unit according to claim 8, wherein a Zener diode is connected between the ends of the parallel arms to regulate the voltage for the transistor switch and the relay coil.

10. A branching unit according to claim 9, wherein the earth return is a sea earth.

11. A branching unit according to claim 10, wherein the switching circuit is responsive to an optical supervisory signal provided over one of the optical fibers.

12. A branching unit according to claim 10, wherein the switching circuit is responsive to an electrical supervisory signal provided over the electrical conductor.

13. A branching unit according to claim 7, wherein a Zener diode is connected between the ends of the parallel arms to regulate the voltage for the transistor switch and the relay coil.

14. A branching unit according to claim 1, wherein the switching circuit comprises a relay coil.

15. A branching unit according to claim 1, wherein the switching circuit comprises a latching relay which is effective once switched to maintain the routing via the earth return until power is removed.

16. A branching unit according to claim 1, wherein the earth return is a sea earth.

17. A branching unit according to claim 1, wherein the switching circuit is responsive to an optical supervisory signal provided over one of the optical fibers.

18. A branching unit according to claim 1, wherein the switching circuit is responsive to an electrical supervisory signal provided over the electrical conductor.

19. An optical transmission system comprising a trunk cable having one or more spaced branching units, wherein a switching circuit selectively routes power between electrical conductors of each trunk section or via an earth return in response to a supervisory signal provided on the trunk cable, and wherein the switching circuit in each branching unit is responsive to a different supervisory signal thereby to permit selective coupling of power between adjacent branching units in response to a supervisory signal provided from at least one cable end to permit isolation of power feed to a trunk section.

* * * * *